United States Patent [19]

Huck et al.

[11] Patent Number: 5,353,598
[45] Date of Patent: Oct. 11, 1994

[54] DAMPING SYSTEM FOR HIGH FREQUENCY COMBUSTION INSTABILITIES IN A COMBUSTION CHAMBER

[75] Inventors: André Huck, Saint Just; Alain Kernilis, Paris; Jean-Paul Druart, Notre Dame de L'Isle; Georges Dorville, Rouen, all of France

[73] Assignee: Societe Europeenne de Propulsion, Suresnes, France

[21] Appl. No.: 993,013

[22] Filed: Dec. 18, 1992

[30] Foreign Application Priority Data

Dec. 20, 1991 [FR] France ............... 91 15944

[51] Int. Cl.⁵ .................................. F02C 7/24
[52] U.S. Cl. ..................... 60/725; 239/265.11; 181/213
[58] Field of Search .................... 60/725, 271; 239/265.11; 181/207, 208, 213, 222

[56] References Cited

U.S. PATENT DOCUMENTS

| | | | |
|---|---|---|---|
| 3,687,224 | 8/1972 | Lundin | 181/207 |
| 4,100,993 | 7/1978 | Feder | 181/213 |
| 4,106,587 | 8/1978 | Nash et al. | 181/213 |
| 4,150,732 | 4/1979 | Hoch et al. | 181/213 |
| 4,409,787 | 10/1983 | Davi | 60/725 |
| 4,944,362 | 7/1990 | Motsinger | 181/213 |

FOREIGN PATENT DOCUMENTS

| | | | |
|---|---|---|---|
| 2356820 | 1/1978 | France . | |
| 2376994 | 8/1978 | France . | |
| 1395845 | 5/1988 | U.S.S.R. | 181/213 |
| 2090334 | 7/1982 | United Kingdom . | |

Primary Examiner—Louis J. Casaregola
Assistant Examiner—W. J. Wicker
Attorney, Agent, or Firm—Weingarten, Schurgin, Gagnebin & Hayes

[57] ABSTRACT

The damping system comprises at least one resonant acoustic cavity disposed around the combustion chamber and having a shape and dimensions such that it functions simultaneously as a quarter-wave resonator and with tangential coupling the resonant acoustic cavity comprises:

a) a main annular part whose half axial section has a very elongate shape with a width dimension "e" which is very small compared to its longitudinal dimension "$L_1$" which extends substantially parallel to the axis of symmetry of the combustion chamber, the mean radius "R" of the main annular part being close to the equivalent radius of modes of oscillation to be damped, and b) an annular coupling part which originates from the main annular part and which opens into the combustion chamber near to a longitudinal or radial pressure anti-node, the annular coupling part having a length "$L_2$" in a half axial section and a width dimension "h" very much less than the sum of the longitudinal dimension "$L_1$" of the main annular part and the length "$L_2$" of the annular coupling part.

30 Claims, 10 Drawing Sheets

FIG.18

DAMPING SYSTEM FOR HIGH FREQUENCY COMBUSTION INSTABILITIES IN A COMBUSTION CHAMBER

Field of the invention

The present invention concerns a damping system for high frequency combustion instabilities in a combustion chamber, especially in a rocket engine, using at least one resonant acoustic cavity communicating with the combustion chamber.

Combustion instabilities tend to be produced in all kinds of combustion chambers in which there are high developments of heat, but they are particularly critical in the case of combustion chambers of rocket engines.

Combustion instabilities result mainly in the destruction of the thin boundary layer which is normally created in the vicinity of the inside walls of a combustion chamber, and which serves to protect them. This destruction of the boundary layer gives rise to an abnormal increase in the temperature of the walls of the chamber and to progressive destruction by burning of the injector and of the chamber.

Moreover, high frequency instabilities transmit vibrations to the interior of the propulsion unit, tending to damage some parts.

PRIOR ART

It has already been proposed to reduce the instabilities in combustion chambers of rocket engines using resonant acoustic cavities.

Thus a damping device for oscillations in the combustion chamber of liquid propellant rocket engines is known from FR-A 2 570 129, the damping device being formed by a group of bottle-shaped chambers located in the bottom of the combustion chamber, between the injectors and inside the injection head, and communicating with the interior of the combustion chamber through channels opening out between the outlet openings of the injectors.

Such a design, which seeks to act as close as possible to the injectors, does not allow all the instability phenomena occurring in a combustion chamber to be remedied efficiently and moreover implies the provision of a large number of damping chambers of large size, of the type functioning as Helmholtz resonators, which makes the implementation of the injection head more complex and costly, which tends to increase the size thereof, and which makes it difficult to adapt to pre-existing combustion chambers since the injection head would need to be redesigned.

It has also been proposed to implement resonant acoustic cavities of relatively large volume, especially of the Helmholtz resonator type, outside but as close as possible to the injection head. However, the large volume of the cavities leads to difficulties of practical placement.

It is also known to fit acoustic absorption devices inside the combustion chamber, in the form of a cylindrical liner pierced with holes distributed over the liner, in such a manner as to form a double wall all the way round the combustion chamber, the combustion gases being able to penetrate behind the liner through the holes to set up an oscillatory system adapted to damp the combustion instabilities.

Such liners are however rather tricky and expensive to implement, their characteristics having to be defined in an essentially empirical manner for each type of combustion chamber, and it is difficult to design such liners in such a way that they can damp all the oscillation frequencies of significant amplitude identified as likely to appear in the course of operation.

Finally, it has been proposed to implement resonant acoustic cavities of the quarter-wave resonator type in the form of tubes. The local action of such cavities does not allow all oscillations resulting from rotations of zones forming pressure anti-nodes to be efficiently damped or suppressed and tangential modes of oscillation are not properly damped.

OBJECT AND BRIEF DESCRIPTION OF THE INVENTION

The invention seeks to enable attenuation or efficient elimination of high frequency combustion instabilities in a combustion chamber, especially of a rocket engine, without substantially increasing the mass or size of the combustion chamber and without imposing any substantial modifications on the manufacturing technology used for existing combustion chambers.

The invention further seeks to enable specific and efficient action simultaneously at several frequencies of oscillation to be damped, while offering a certain freedom in practical implementation of the damping means.

These objects are met by a damping system for high frequency combustion instabilities in a combustion chamber, characterized in that it comprises at least one resonant acoustic cavity disposed around the combustion chamber and having a shape and dimensions such that it functions simultaneously as a quarter-wave resonator and with tangential coupling, allowing simultaneous damping of longitudinal pressure waves, radial pressure waves, tangential pressure waves and combinations of these various types of waves.

More specifically, according to the invention, the resonant acoustic cavity functioning as a quarter-wave resonator and with tangential coupling comprises:

a) a main annular part whose half axial section has a very elongate shape with a width dimension "e" which is very small compared to its longitudinal dimension "$L_1$" which extends substantially parallel to the axis of symmetry of the combustion chamber, the mean radius "R" of the main annular part being close to the equivalent radius of modes of oscillation to be damped, and b) an annular coupling part which originates from the main annular part and which opens into the combustion chamber near to a longitudinal or radial pressure anti-node, the annular coupling part having a length "$L_2$" in a half axial section and a width dimension "h" very much less than the sum of the longitudinal dimension "$L_1$" of the main annular part and the length "$L_2$" of the annular coupling part.

In practice, the width dimension "e" of the main annular part and the width dimension "h" of the annular coupling part of the resonant acoustic cavity may be in the range some tenths of a millimeter to about ten millimeters.

In any event, the width dimension "e" is very much smaller than the length of the main annular part and in consequence is also very much smaller than the wavelength of the oscillations to be damped to which the acoustic cavity is tuned.

The invention makes it possible to damp oscillations whose frequencies lie in the range some hundreds of Hertz to about ten kHz.

The presence of a main annular part makes it possible to ensure that tangential modes are damped but does not prevent the possibility of damping oscillations of differing frequencies, either by implementing multiple cavities or else by forming portions of varying length within the same annular cavity.

Thus, in one particular embodiment, the main annular part has parts of differing lengths around the perimeter of the combustion chamber, corresponding to differing damping frequencies, the bottom wall remote from the region in which the annular coupling part originates being located at differing distances from the said annular coupling part but with a minimum distance allowing damping with tangential coupling.

In this case, in a more specific implementation, the said bottom wall remote from the region in which the annular coupling part originates has the shape of a succession of steps.

In another specific implementation, the said bottom wall remote from the region in which the annular coupling part originates has an undulating shape of sinusoidal or sawtooth form.

The damping system according to the invention may comprise a plurality of resonant acoustic cavities adapted to differing oscillations, comprising a plurality of coaxial main annular parts opening into annular coupling parts having at least one common portion opening into the combustion chamber.

The damping system may also comprise a plurality of resonant acoustic cavities adapted to differing oscillations, comprising annular coupling parts opening into the combustion chamber at different levels.

For each resonant acoustic cavity, the annular coupling part may originate in a region located either in the upper end part or in the lower end part of the main annular part.

The annular coupling part may itself open into the combustion chamber through a circular aperture extending over the whole perimeter of the chamber or through a discontinuous circular aperture located in a plane perpendicular to the axis of the combustion chamber.

Advantageously, the main annular part has a half axial section substantially in the form of a very elongate rectangle, while regardless of its shape, it is possible to associate cooling channels with the acoustic cavity, bordering the same.

A damping system according to the invention may be implemented in a particularly simple and efficient manner by providing an annular acoustic cavity whose main annular part is located behind the throat of the nozzle and has a radius "R" substantially equal to the radius "Ro" of the combustion chamber.

Advantageously the annular coupling part opens into the combustion chamber at the level of the upper forth of the part forming the throat of the nozzle.

In a particular embodiment which is especially easy to implement and does not increase the size, the annular coupling part is formed by a continuous aperture provided between a lower main insert and a upper secondary insert defining the throat of the nozzle and the main annular part is located between the outer surface of the lower main insert and the inner surface of the wall which delimits the combustion chamber and to which said lower main insert and upper secondary insert are attached.

In another particular embodiment likewise simple to implement, the annular coupling part is formed by a discontinuous aperture provided around the perimeter of the combustion chamber in a single solid block insert defining the throat of the nozzle and the main annular part is located between the outer surface of the said single solid block insert and the inner surface of the wall which delimits the combustion chamber and to which said single solid block insert is attached.

In the case of a rocket engine whose nozzle is cooled by parallel vertical or helical cooling channels, the damping system of the invention can be implemented easily in the form of a cylindrical collar built round the nozzle to define the said resonant acoustic cavity. The annular coupling part of the acoustic cavity may then open into the combustion chamber through a series of apertures formed in the wall of the nozzle between the cooling channels.

In the case of a rocket engine whose nozzle is formed from welded or brazed cooling tubes, the damping system of the invention can likewise easily be implemented in the form a cylindrical collar built round the nozzle to define said resonant acoustic cavity. The annular coupling part may then open into the combustion chamber through a series of passages formed by necked in parts of the tubes forming the wall of the nozzle.

In the above two embodiments, the cylindrical collar may be formed from a plurality of sectors welded together.

Each resonant acoustic cavity of quarter-wave resonator type is the site of standing waves and absorbs the energy of oscillations to be damped by viscous friction leading to generation of heat, which increases the temperature of the walls, over and above that resulting simply from the heat contribution of the combustion gases.

A cooling circuit may thus be used adjacent to the resonant acoustic cavity and can be easily implemented, especially when the cavity is implemented in the form of an associated cylindrical collar.

In the case of a rocket engine whose nozzle is formed in two parts connected by flanges, the resonant acoustic cavity may be delimited by walls pertaining respectively to the two constituent parts of the nozzle. In this case the resonant acoustic cavity is cooled by means of cooling channels pertaining respectively to the two constituent parts of the nozzle and communicating with the cooling channels of the wall of the nozzle.

In one possible embodiment, the main annular part is fitted between a bulge in the wall of the nozzle and a partition located at the side of the combustion chamber, means being provided to cool the said partition with a film of propellant on the face opposite that bounding the main annular part and the annular coupling part originates at a region located in the lower part of the main annular part.

BRIEF DESCRIPTION OF THE DRAWINGS

Other characteristics and advantages of the invention appear from the following description of particular embodiments, given by way of non-limiting example, with reference to the accompanying drawings, in which.

DETAILED DESCRIPTION OF THE EMBODIMENTS

Figures 1, 1A:
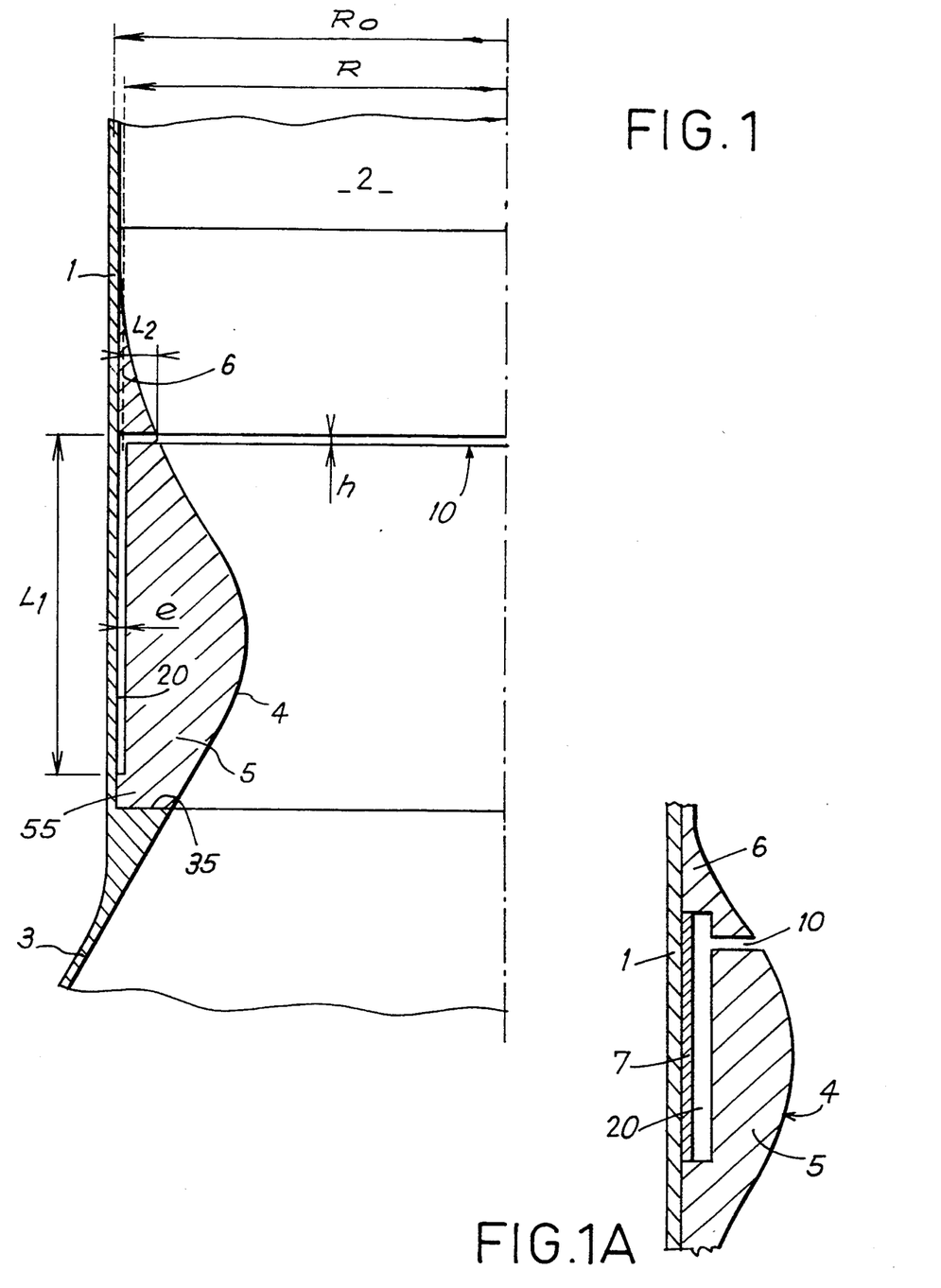
FIG. 1 is a half axial section of a nozzle part of a rocket engine whose throat is defined by an insert provided with a resonant acoustic cavity in a first embodiment of the invention.
FIG. 1A is fragmentary view of FIG. 1 showing a modification of the resonant acoustic cavity.

FIG. 1 shows a rocket engine nozzle comprising an outer wall 1 which delimits the combustion chamber 2, extending downwards around the part corresponding to the throat 4 of the nozzle and forming in the part further downstream the divergent mouth 3 of the nozzle.

A main insert 5, formed as a body of revolution and which can be made of metal or of ceramic or of composite material, is attached to the inside of the cylindrical wall 1 of the nozzle to define the throat 4 of the nozzle, through which the hot gases are ejected towards the ejection cone or divergent mouth 3.

At its bottom, the main insert 5 has a centering collar 55 which rests on a shoulder 35 formed by the wall 1 of the combustion chamber at the top of the divergent mouth 3. The centering collar 55 in contact with the wall 1 projects a distance "e" relative to the outer cylindrical surface of the main insert 5, so that an annular cavity 20 defined by two coaxial cylindrical surfaces is formed between the main insert 5 and the outer wall 1 of the nozzle.

An additional insert 6 also formed as a body of revolution is attached, for example by welding or adhesive, to the inside of the wall 1 of the combustion chamber 2 so as to define a convergent part between the substantially cylindrical part of the wall 1 of the combustion chamber 2 and the throat 4 of the nozzle defined by the main insert 5. A continuous annular aperture 10, whose inclination may be arbitrary relative to the axis of the nozzle, but which opens into the combustion chamber 2 near to a longitudinal or radial pressure anti-node, is provided between the main insert 5 and the additional insert 6. The annular aperture 10, which has a sized width h and a length $L_2$ in a transverse direction relative to the nozzle, originates in the main annular part 20 of the cavity., formed behind the main insert 5, to provide coupling between this main annular part 20 and the combustion chamber 2.

The annular coupling aperture 10, in the example of FIG. 1, originates at the upper end of the main annular part 20 and opens into the combustion chamber 2 at the level of the upper quarter of the assembly of inserts 5, 6 defining the throat 4 of the nozzle.

The formation of a resonant acoustic cavity 10, 20 located at the level of the throat 4 of the nozzle, between an outer wall 1 and one or more inserts 5, 6, is particularly simple and increases neither the size nor the mass of the propulsion unit.

The main annular part 20 of the acoustic cavity, which has a half axial section as is shown in FIG. 1 of very elongate and essentially rectangular in shape with a width dimension e that is very small relative to the longitudinal dimension $L_1$, has in the case of FIG. 1 a mean radius R which is slightly less than the radius Ro of the wall 1 of the combustion chamber 2.

The resonant acoustic cavity 10, 20 of FIG. 1 is thus well suited to damp modes of oscillation having an equivalent radius close to that of the wall 1 of the combustion chamber 2.

The total length L of the section of the cavity 10, 20, which corresponds to the sum of the lengths $L_1$ and $L_2$ of the median lines of sections in an axial plane respectively of the main annular part 20 and the annular coupling aperture 10, depends essentially on the values of the oscillation frequencies to be damped.

The oscillation frequencies which correspond to combustion instabilities to be damped can lie in the range some tens of Hertz to about ten kHz.

The width e of the main annular part 20 and the width h of the annular coupling aperture 10 are in any event very much smaller than the total length L and may lie in the range some tenths of a millimeter to about ten millimeters.

These values correspond to those which apply in operation under the pressure of hot gas and may not be entirely constant.

According to an essential feature of the invention, the resonant acoustic cavity 10, 20 has characteristics of shape and size such that it forms a quarter-wave resonator, while ensuring tangential coupling because of its annular configuration.

FIG. 1A shows a modification in which a sleeve 7 is placed against the wall of the combustion chamber to ensure that a space is maintained between the main insert 5 and the additional insert 6 defining both the throat 4 of the nozzle and the geometrical characteristics of the acoustic cavity 10, 20.

In FIG. 1A there is also shown an annular coupling aperture 10 which does not originate at the extreme upper end of the main part 20 of the cavity, thus creating two resonant cavities of different lengths.

Figure 7:
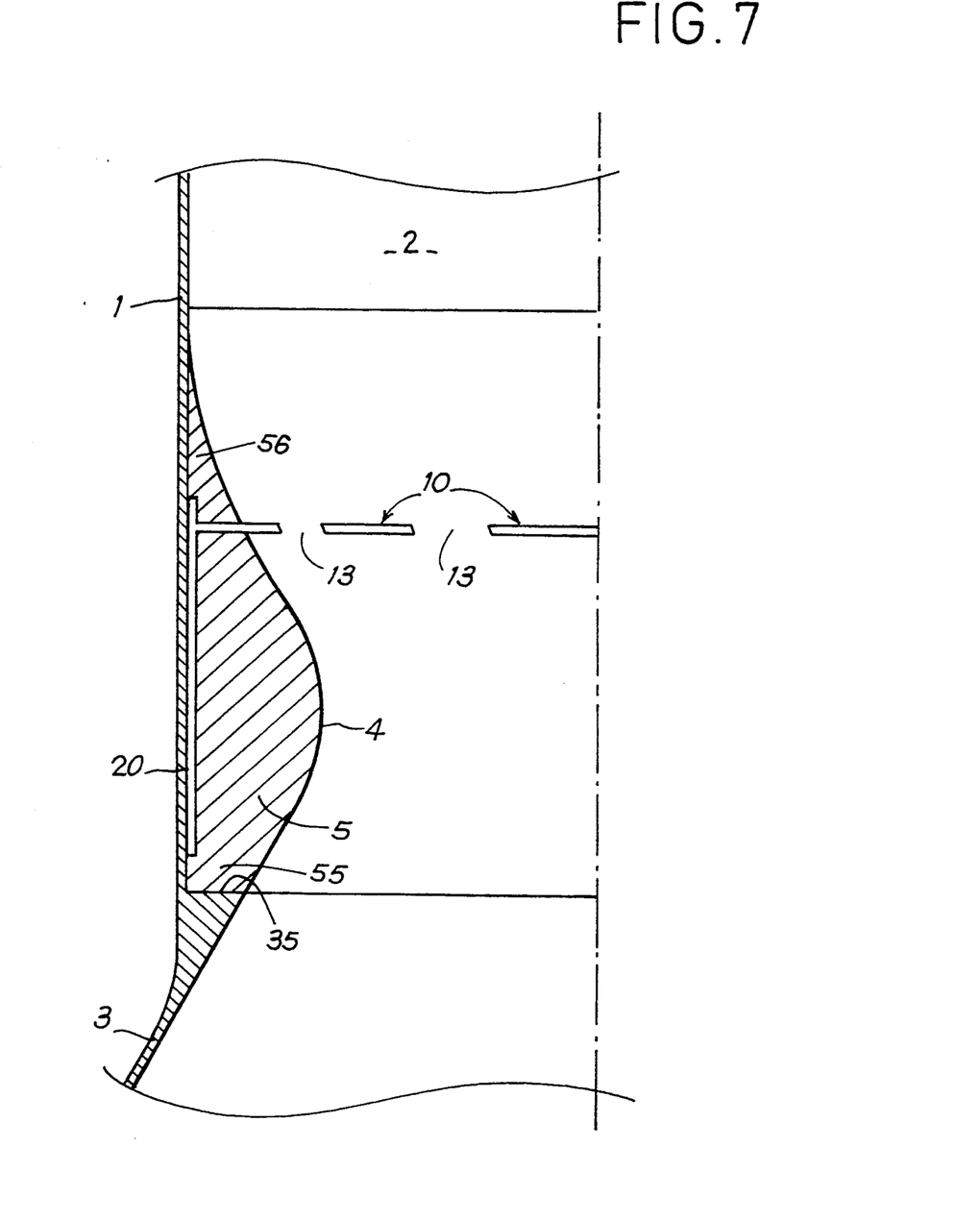
FIG. 7 is a view like FIG. 1, corresponding to a variant in which the acoustic cavity opens into the combustion chamber through a discontinuous aperture.

FIG. 7 shows an embodiment very much like that of FIGS. 1 and 1A, but in which a single insert 5, made of metal or composite material, is attached to the inside of the wall 1 of the combustion chamber 2 to define both the throat 4 and the acoustic cavity 10, 20. The upper and lower parts 56 and 55 of the insert 5 form means centering the insert relative to the wall 1, while the central part of the insert 5 defines, by its external cylindrical surface of slightly smaller radius than that of the wall 1, the main annular part 20 of the acoustic cavity 10, 20.

In the case of FIG. 7, the circular coupling aperture 10 between the acoustic cavity and the combustion chamber is discontinuous and is interrupted by non-open portions 13.

The invention acts equally well in the case of circular outlet apertures 10 formed over the entire perimeter of the combustion chamber 2 (FIG. 1) and of annular coupling parts 10 opening into the combustion chamber 2 only through discontinuous apertures defining localized openings distributed around a circle in a plane perpendicular to the axis of the combustion chamber 2.

FIGS. 2 to 6 and 2a, 3a, show different ways of implementing the acoustic cavities 10, 20 of the invention, i.e. the cavities behaving as quarter-wave resonators with circumferential coupling allowing simultaneous damping of longitudinal pressure waves, of radial pressure waves, of tangential pressure waves, and of combinations of these various types of wave, created in the combustion chamber 2 as a result of combustion instabilities.

In the embodiments of FIGS. 1 to 7, the acoustic cavity 10, 20 is located at the level of the nozzle and opens into the combustion chamber 2 at the level of the upper quarter of the insert 5 or inserts 5, 6 forming the throat 4 of the nozzle. Such a layout is efficient, although the cavity 10, 20 is remote from the injection head of the rocket engine.

In relation to a tangential coupling it is preferred to implement an acoustic cavity having a main annular part 20 whose radius is not too different from that of the wall of the combustion chamber 2.

Figure 2:
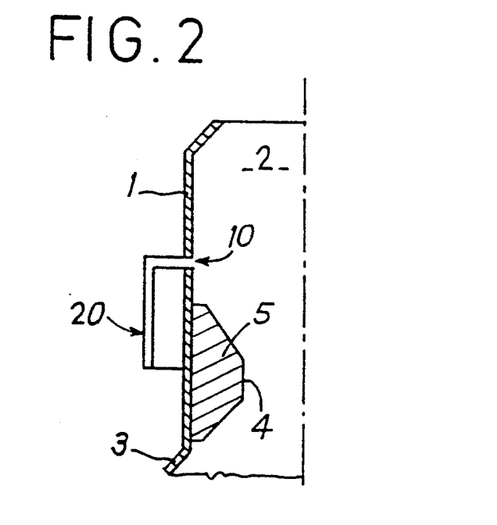
FIGS. 2 and 3 are schematic half axial sections of a combustion chamber showing two possible configurations of resonant acoustic cavities of the invention, the main part of the cavity being located respectively below and above the coupling channel with the combustion chamber.

In the configuration of FIG. 2, there is shown an acoustic cavity 10, 20 of the invention, coaxial with the combustion chamber 2, with an annular coupling part 10 which opens into the combustion chamber immediately above the throat 4, and a main annular part 20 which is directed towards the bottom relative to the annular coupling part 10 and which is located outside the wall 1 of the chamber 2.

Figure 3:
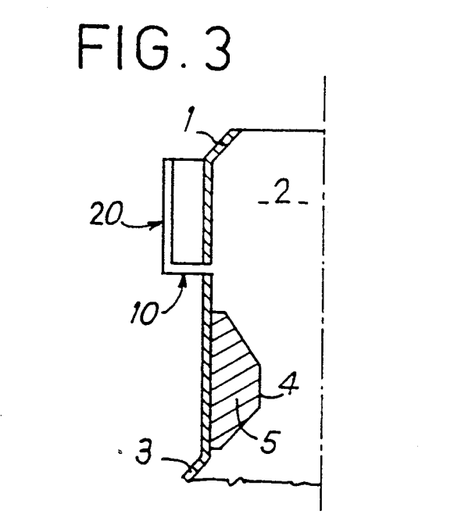

FIG. 3 concerns another possible embodiment, which shows that the main annular part 20 of an acoustic cavity 10, 20 may be directed towards the top relative to the annular coupling part 10 and is not necessarily located at the level of the throat 4 of the nozzle.

Figure 2A:
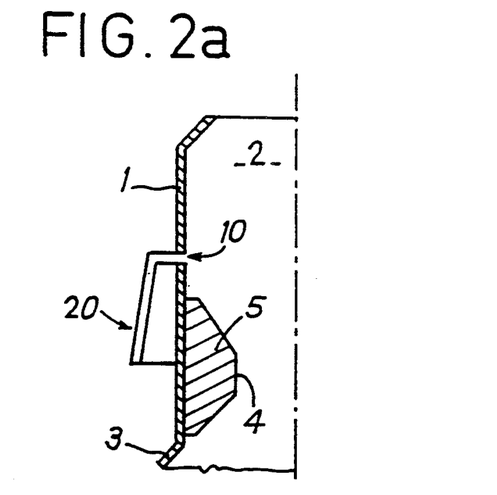
FIG. 2a and 3a are schematic half axial sections of a combustion chamber showing modifications of the resonant acoustic cavities of FIGS. 2 and 3, respectively with a main annular part which is not strictly parallel to the axis of the chamber and an annular coupling part which deviates from a radial plane perpendicular to the axis of the chamber.
Figure 3A:
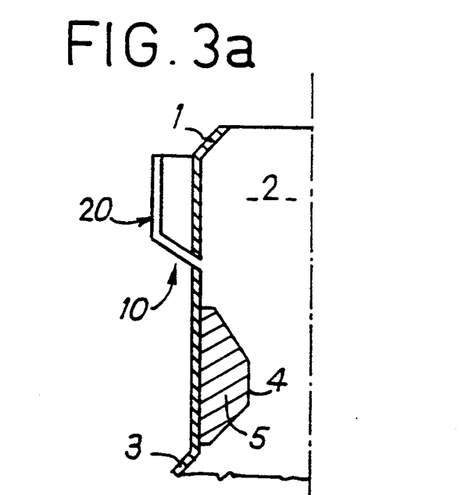

FIGS. 2a and 3a show modifications of FIGS. 2 and 3 respectively. Thus FIG. 2a shows that the main annular part 20 of the cavity may have a certain inclination relative to the axis of the combustion chamber 2 and need not therefore be delimited by strictly cylindrical walls. FIG. 3a shows in the same way that the annular coupling part 10 may somewhat markedly inclined relative to a radial plane perpendicular to the axis of the chamber 2. A combination of the embodiments of FIGS. 2a and 3a is naturally possible.

Figure 4:
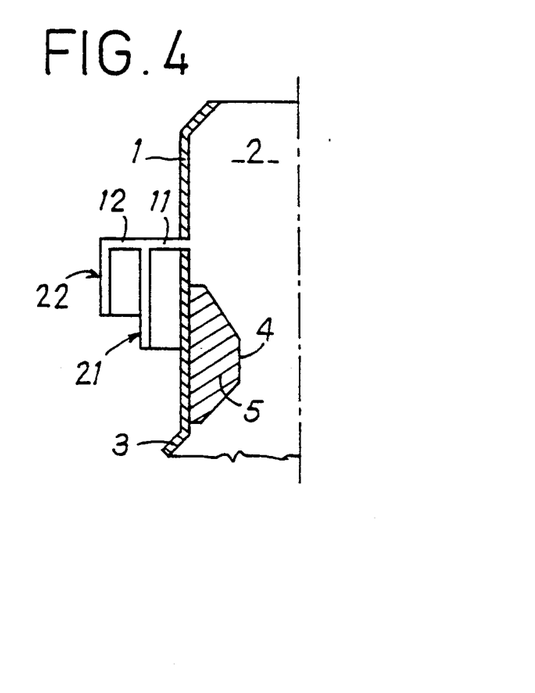
FIGS. 4 to 6 show various designs of damping systems of the invention comprising a plurality of resonant acoustic cavities cooperating with a combustion chamber of a rocket engine, seen in half axial section.
Figure 6:
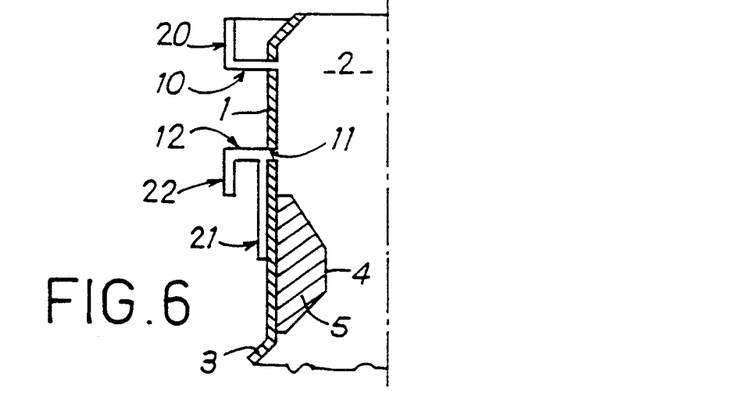

FIGS. 4 and 6 show that it is possible to implement a plurality of resonant acoustic cavities simultaneously with the same combustion chamber 2, operating in accordance with the invention as quarter-wave resonators and with tangential coupling.

FIG. 4 shows the implementation of two resonant acoustic cavities 11, 21 and 12, 22 which have concentric main annular parts 21, 22 of different lengths to match different frequencies. FIG. 4 further shows that the various cavities 11, 21 and 12, 22 can open out into the combustion chamber 2 at the same level through a common annular coupling part 11.

Figure 5:
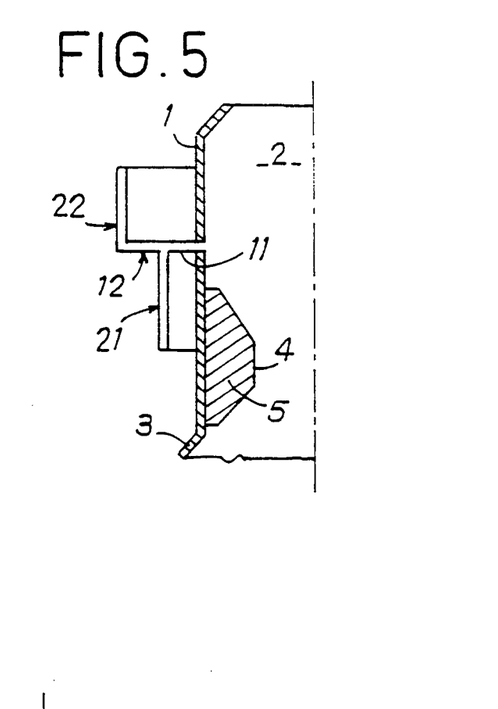

The embodiment of FIG. 5 is related to that of FIG. 4 but shows two resonant acoustic cavities 11, 21 and 12, 22 which, while still opening into the combustion chamber 2 at the same level, are differently directed relative to the common annular coupling part 11, the cavity 11, 21 being directed towards the bottom while the cavity 12, 22 is orientated towards the top.

FIG. 6 further shows another embodiment of multiple resonant acoustic cavities. A first resonant cavity 11, 21 comprises a cylindrical main annular part 21 located behind the wall 1 of the combustion chamber 2 at the level of the nozzle throat 4 and with a radius hardly greater than that of the wall 1. A second resonant cavity 12, 22 comprises a main annular part 22 concentric with and outside the main annular part 21 and directed towards the bottom, but of reduced length, and an annular coupling part 12 which opens into the annular coupling part 11. A third resonant cavity 10, 20 is located in the upper part of the combustion chamber 2, outside the wall 1 and opens into the combustion chamber 2 a little below the region of propellant injection through an annular coupling part 10 independent of the annular coupling parts 11, 12 of the two other cavities.

Various combinations of the general modes of implementation of FIGS. 2 to 6, 2a, 3a and of the particular modes of implementation of FIGS. 1 and 7 to 13 are naturally possible.

As has been indicated with reference to FIGS. 4 to 6, a plurality of different resonant acoustic cavities functioning as quarter-wave resonators and with tangential coupling may be associated with the same combustion chamber 2 in order to damp differing frequencies of oscillation. A single acoustic cavity 10, 20 can however by modified to damp differing frequencies while still preserving the ability to damp tangential modes. This possibility is illustrated in FIGS. 12 and 13, which can correspond in their implementing technology to that of those described with reference to FIGS. 1, 1A, and 7.

Figure 12:
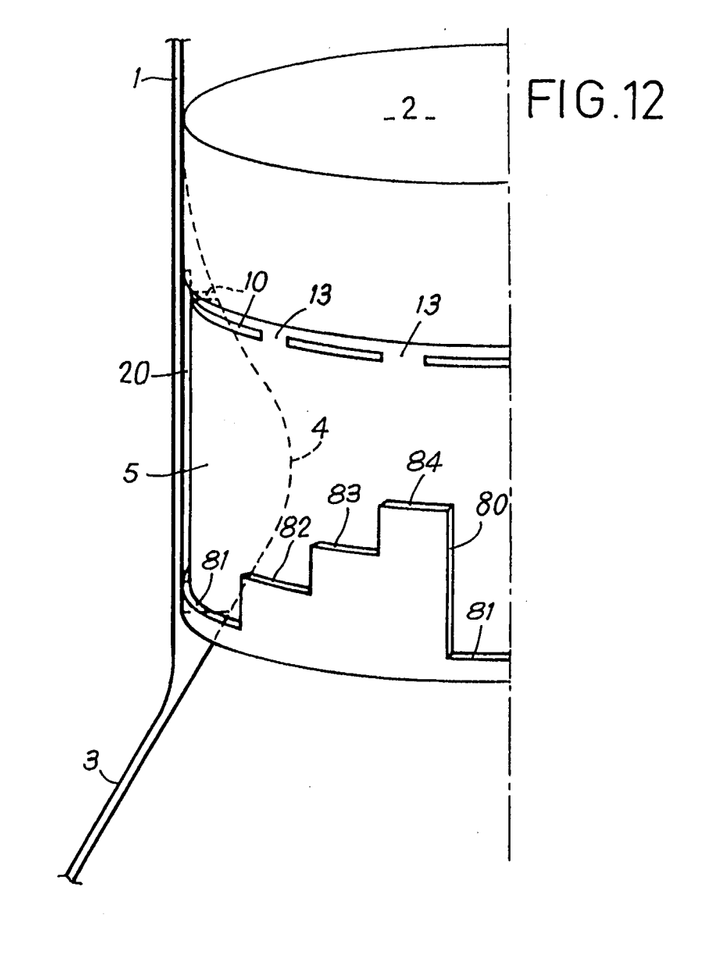
FIG. 12 is a broken away half perspective view of a rocket engine nozzle whose throat is defined by an insert which is provided with an annular acoustic cavity of stepped variable height.

FIG. 12 shows a cavity 10, 20 whose main annular part 20 has portions of differing lengths around the perimeter of the combustion chamber 2, being delimited at their end remote from the annular coupling part 10 by a stepped bottom wall 80, formed by a series of steps 81 to 84. A space of sufficient height in relation to the width dimension e of the main annular part 20 should naturally be preserved between the highest step and the annular coupling part 10, which may be a continuous aperture or, as in FIG. 12, a discontinuous aperture.

Figure 13:
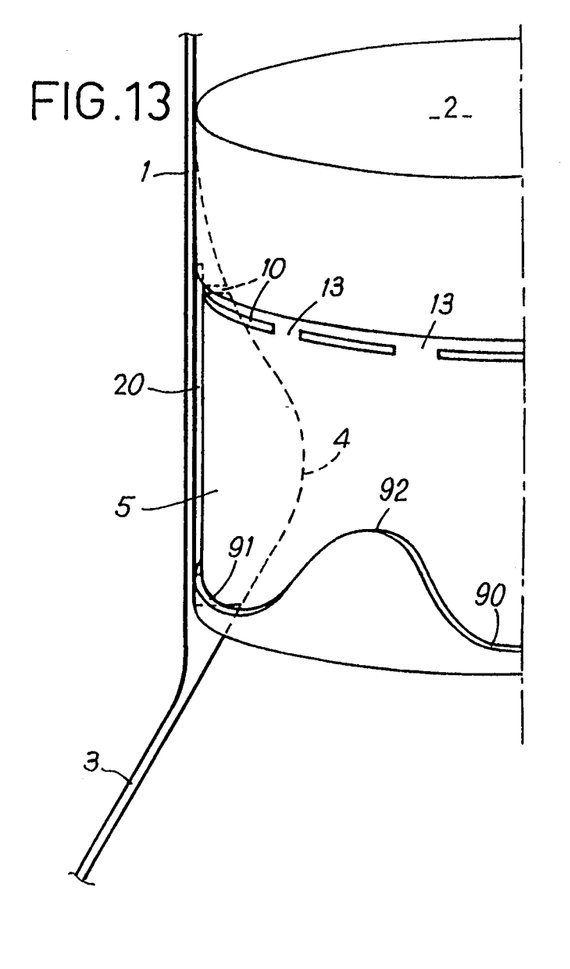
FIG. 13 is a broken away half perspective view of a rocket engine nozzle whose throat is defined by an insert which is provided with an annular acoustic cavity of height that varies in accordance with a sinusoidal law.

FIG. 13 shows a cavity 10, 20 which, as in the case of FIG. 12, comprises a main annular part 20 with portions of varying length around the perimeter of the combustion chamber 2.

Figure 18:
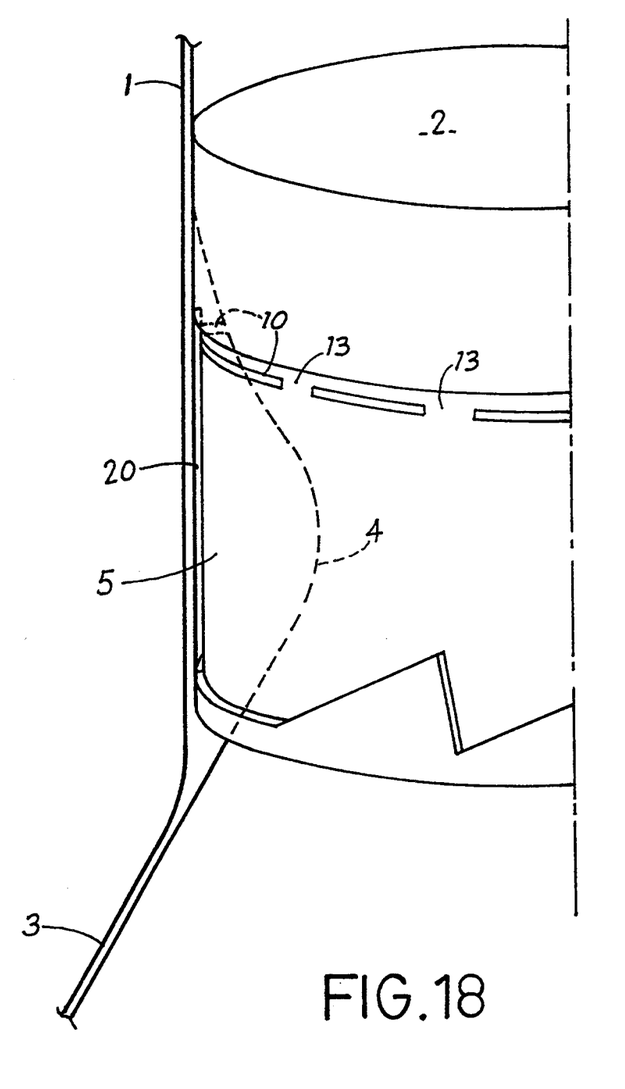
FIG. 18 is a broken away half perspective view of a rocket engine nozzle whose throat is defined by an insert which is provided with an annular acoustic cavity of variable height having a sawtooth configuration.

In the case of FIG. 13, the bottom wall 90 delimiting the main annular part 20 at the end remote from the annular coupling part 10 has a shape varying continuously between a maximum and a minimum. In FIG. 13 the wall of the bottom has a sinusoidal form but it could have other shapes, for example that of a sawtooth, such as that shown in FIG. 18. The main annular part 20 forms the equivalent of juxtaposed vertical quarter-wave cavities of differing lengths, damping differing frequencies, still while allowing tangential coupling into the annular region remaining free above the bottom wall 90.

A resonant acoustic cavity 10, 20 may if needed contain obstacles such as baffles, gratings or fibrous material, adapted to increase the damping of acoustic waves. These obstacles should not however create any interruption in the continuity of the cavity. Moreover, the fibrous products which are used should be able to withstand the temperature of the hot gases and may be formed for example from cellular aluminum or ceramic fibers.

Several other particular embodiments of a damping system for high frequency instabilities in accordance with the invention will be described below.

Figure 8:
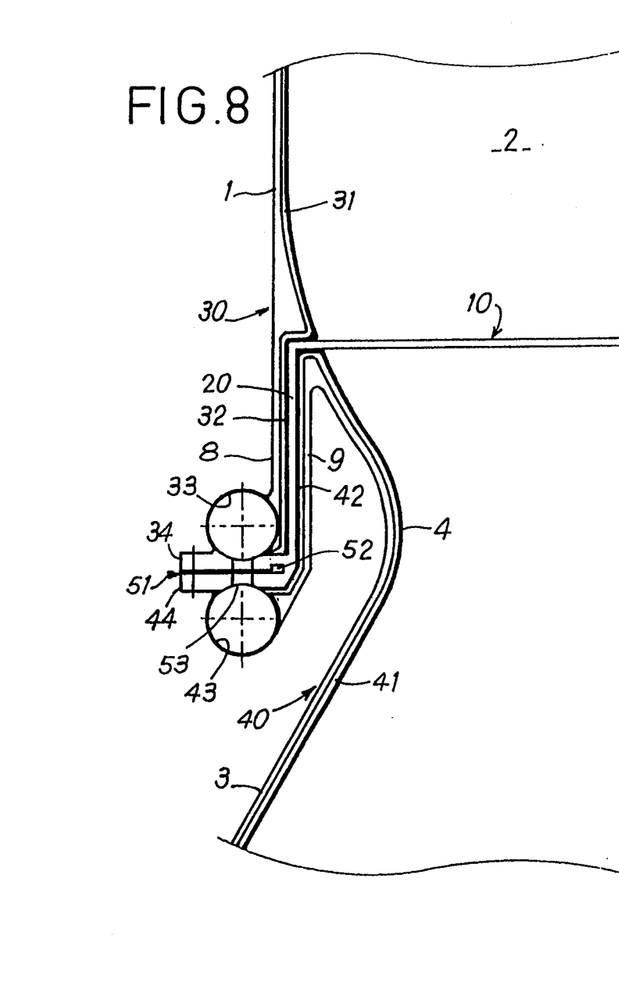
FIG. 8 is a half axial section of a rocket engine nozzle formed in two parts connected by flanges and provided with a cooled acoustic cavity interposed between the two parts forming the nozzle.

Referring to FIG. 8, there is seen a rocket engine nozzle formed in two parts, the first part 30 forming with a wall 1 the essential part of the combustion chamber 2, whose section changes little and the second part 40 forming the essentials of the convergent part, the throat 4 and the divergent mouth 3 of the nozzle. Each of the two parts 30, 40 of the nozzle may be provided with a cooling circuit formed by channels 31 and 41 respectively for circulating cooling propellant. The two parts 30, 40 of the nozzle are connected by a flange joint 34, 44 and the cooling circuits 31, 41 of the first and second parts 30, 40 open into ring manifolds 33, 43, possibly interconnected through communicating holes 53.

In conformity with the present invention, an acoustic cavity 10, 20 is formed between the two parts 30, 40 forming the nozzle, in the region of their interconnection, through telescoping together of the two parts 30, 40. Thus the substantially cylindrical wall of the combustion chamber 2 defined by the first part 30 is extended towards the bottom by a cylindrical wall 8 whose end carries the ring manifold 33 and the flange 34. The wall of the second part 40 defining the throat 4 and the divergent mouth 3 of the nozzle is itself turned back from its upper end to form a cylindrical wall 9 behind the throat 4, facing the cylindrical wall 8 and forming therewith the acoustic cavity 10, 20, which may in particular have an annular coupling part 10 opening into the combustion chamber 2 through an annular space of defined size between the wall 1 of the first part 30 and the walls 4, 3 of the second part 40. The main annular part 20 of the acoustic cavity is defined by the annular space between the two cylindrical walls 8, 9. A seal 52 ensures tightness of the main annular part 20 in the region of the flanges 34, 44. The cooling channels 31 of the wall are extended through the wall 8 by cooling channels 32, which ensure cooling of the acoustic cavity 10, 20 and open into the cooling ring manifold 33. In similar manner, the cooling channels 41 of the wall forming the throat 4 and the divergent mouth 3 are extended through the wall 9 by cooling channels 42, which border the cavity 10, 20 and open into the cooling ring manifold 43.

Figures 9, 9A:
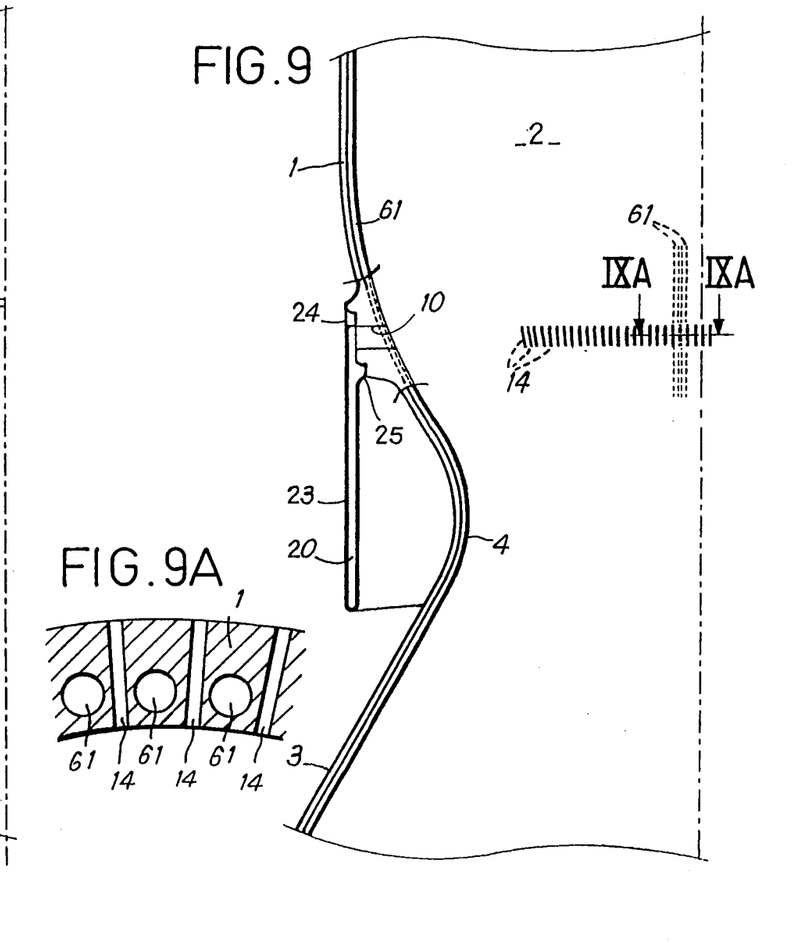
FIG. 9 is a half axial section of rocket engine nozzle cooled by channels, provided with an associated cylindrical collar forming an annular acoustic cavity of the invention.
FIG. 9A shows a detail of implementation on section IXA—IXA in FIG. 9.

FIG. 9 shows a nozzle whose wall is cooled by vertical or helicoidal channels 61 (see also FIG. 9A). An acoustic cavity 10, 20 forming a damping system for HF instabilities in accordance with the invention is formed with the aid of a collar 23, formed from two concentric cylindrical walls, connected round the throat 4 of the nozzle, closed at the bottom and welded for example at the top by annular weld beads 24, 25 to the wall 1 of the combustion chamber, a little above the throat 4, the collar 23 being able to have a radius very close to that of the cylindrical part of the combustion chamber 2.

The annular coupling part 10 between the main annular part 20 and the combustion chamber 2 may be formed by a set of vertical apertures 14 distributed over the perimeter of the chamber 2, and machined for example by electro-erosion in the regions of the wall 1 of the chamber 2 located between the cooling channels 61.

The fact that the apertures communicate with the said annular coupling part 10 and that this annular part forms a continuous cavity allows tangential modes to be damped.

In this embodiment, the cavity 10, 20, which may or may not be provided with cooling means, could have a radius greater than that of the combustion chamber and could be located in a region which is not in the immediate vicinity of the throat, as in the embodiments of FIGS. 3, 5 and 6 for example.

Figure 10:
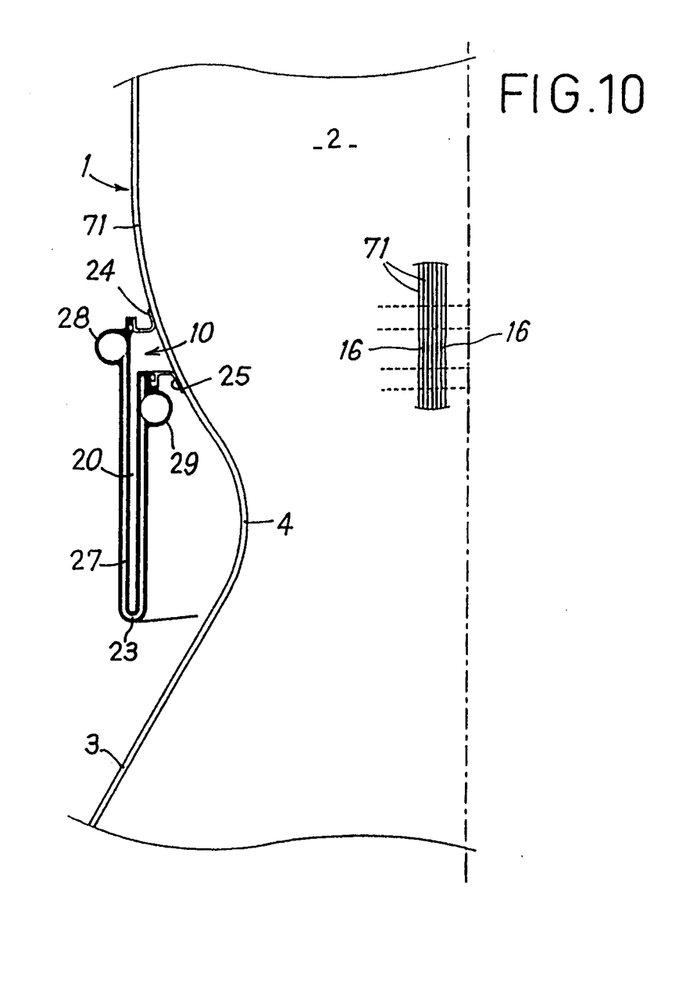
FIG. 10 is a half axial section of a rocket engine nozzle formed by welded cooling tubes, fitted with a cylindrical collar forming an annular acoustic cavity of the invention and provided with cooling means.

FIG. 10 shows a nozzle formed from cooling tubes 71 welded or brazed to each other. In this case, an acoustic cavity 10, 20 can be formed in a manner just like that of the embodiment of FIG. 9, with the aid of a collar 23 formed from two concentric cylindrical surfaces, connected for example round the throat 5 of the nozzle, closed at the bottom and welded for example at the top by annular weld beads 24, 25 to the outer face of the wall 1 of the nozzle. The collar 23 may however be formed for preference of a plurality of sectors welded together, which facilitates assembly of cooling means 27 to 29, which will be explained later.

The annular coupling part 10 between the main annular part 20 and the combustion chamber 2 may be formed by a set of vertical channels 16 distributed of the whole perimeter of the chamber 2 and formed by swaged parts of the cooling tubes 71. The acoustic cavity 10, 20 may be equipped with cooling means or not. In FIG. 10 there are shown cooling channels 27 which ensure cooling of each of the walls of the main annular part 20 and are connected to ring manifolds 28, 29 for supplying and draining coolant liquid. The assembly of the collar 23 of FIG. 10 and of the cooling means 27 to 29 can be implemented in a single unit if the nozzle is formed in two parts, as in FIG. 8 or may well be implemented by a plurality of sectors assembled with each other without intermediate partitions.

Figure 11:
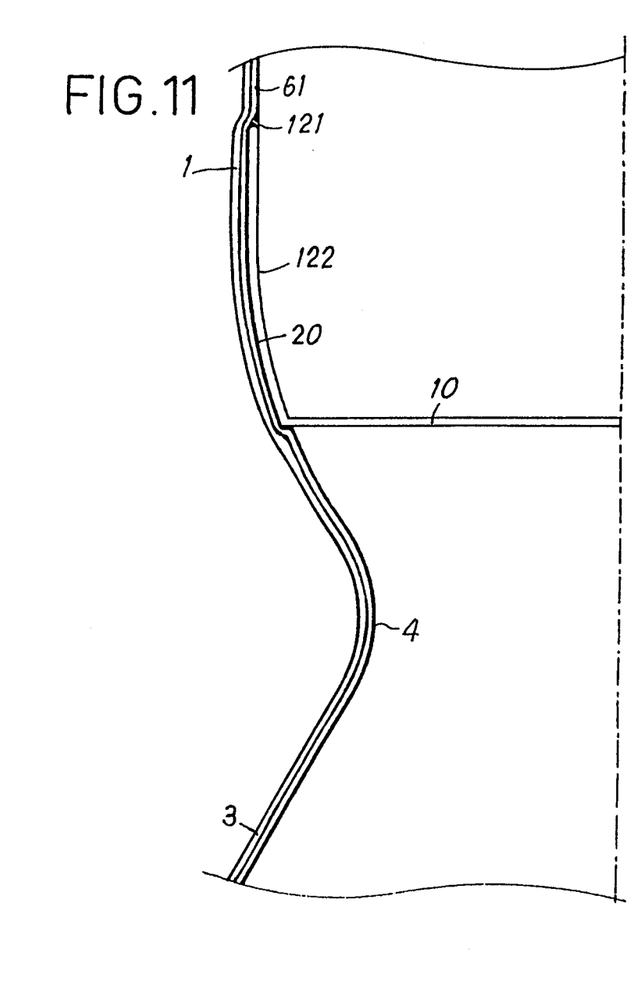
FIG. 11 is a half axial section of a rocket engine nozzle provided with an acoustic cavity between a bulge in the wall of the nozzle and an internal partition of the combustion chamber.

FIG. 11 shows a particular embodiment in which an acoustic cavity 10, 20 is formed above the throat 4 of a nozzle, in a bulge of the wall 1 of the combustion chamber 2. The main annular part 20 of the acoustic cavity 10, 20 is in this case provided between the bulge in the wall 1 of the nozzle and an internal partition 122, cooled by a film of propellant fed through holes 121, by way of a cooling circuit 61 of the wall 1, over the surface of the partition 122 located on the combustion side. In this case the annular coupling part 10 may be formed by a simple circular aperture, intermittent or not, formed at the bottom of the partition 122 above the throat 4. In the embodiment of FIG. 11, the shape of the main annular part 20, seen in half axial section, is not strictly rectangular but is slightly curved in, but still remaining very elongate relative to the width dimension e of the cavity.

As has already been indicated, the positioning of an acoustic cavity in accordance with the invention can be contemplated at various levels of the combustion chamber and of the part forming the nozzle proper. However, when the acoustic cavity is provided level with the throat 4 of the nozzle, optimization of the acoustic cavity and its implementation are greatly facilitated if it is effected where there is a region of excess material (in the case of a throat defined by a insert 5 in one piece or otherwise) and where it can be located with considerable freedom of design without increasing the size, while still forming acoustic cavities 10, 20 of radius substantially equal to that of the combustion chamber 2, which are particularly efficient in ensuring good coupling between tangential waves of the cavity 10, 20 and those of the combustion chamber 2.

The operation of each acoustic cavity 10, 20 as a kind of quarter-wave resonator takes place by attenuating the amplitude of acoustic modes present in the chamber, for those modes whose frequency is near to one of the frequencies of the cavity. This effect is due to absorption of the acoustic energy by viscous and thermal dissipation with the contact between the gas and the walls of the cavity and of the openings of the annular coupling part. The efficiency of the cavity can thus be improved by adapting its shape, the number and position of the openings or the aperture of the annular coupling part 10.

By way of example, a comparative study is described with reference to FIGS. 14 to 17, made by finite elements of acoustic resonances, showing the nature and magnitude of the damping provided with the aid of a damping system in accordance with the invention.

In one such study by finite elements of acoustic resonances, the combustion chamber 2 is assumed to be filled with a gas having the same density as the combustion gases. The characteristics of acoustic resonance waves are calculated inside the combustion chamber 2, up to the throat 4, without combustion, that is to say of waves whose frequency lines in the frequency spectrum have an amplitude attaining a significant value. In particular the modes of pressure waves are determined, i.e. the directions taken by these waves and lying at the resonance frequencies. There exist tangential (circular), longitudinal, and radial modes, and modes combining these. The number of wavelengths comprised in the three dimensions of the combustion chamber 2 are also noted for the differing resonance frequencies. Finally, the acoustic pressure maps inside the combustion chamber are determined in relative values.

Figure 14:
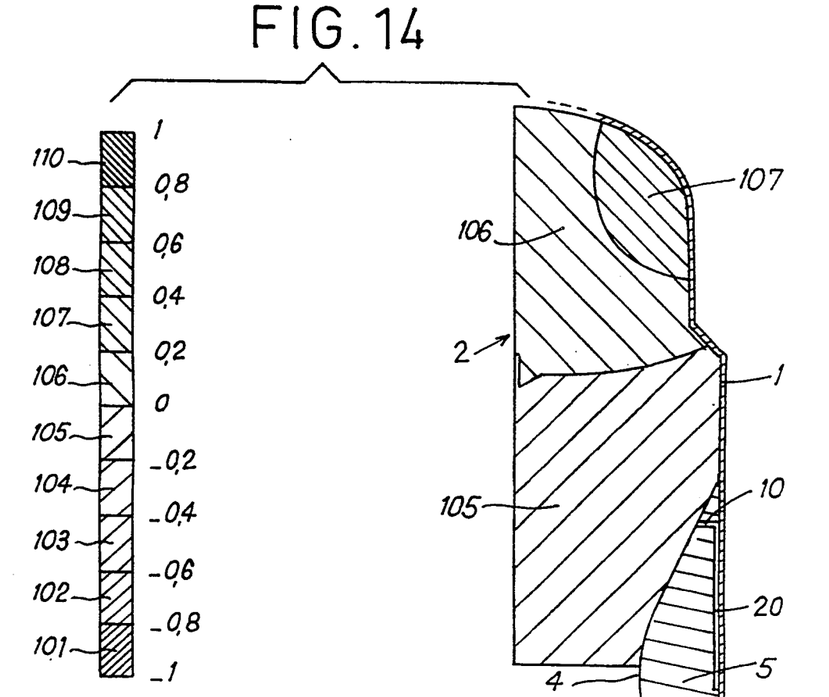
FIGS. 14 and 15 are diagrams showing the terracing of pressure variations respectively for a combustion chamber fitted with a damping system of the invention and for a combustion chamber without such a system, based on modelling with oscillations coupled according to a first tangential mode and to a first longitudinal mode.

FIG. 14 shows the distribution of pressure levels in relative values in a combustion chamber 2 provided with an acoustic cavity 10, 20 of the type functioning as a quarter-wave resonator and with tangential coupling, in conformity with the invention, for a given 1 T1 L mode, i.e. the first tangential, first longitudinal mode.

Figure 15:
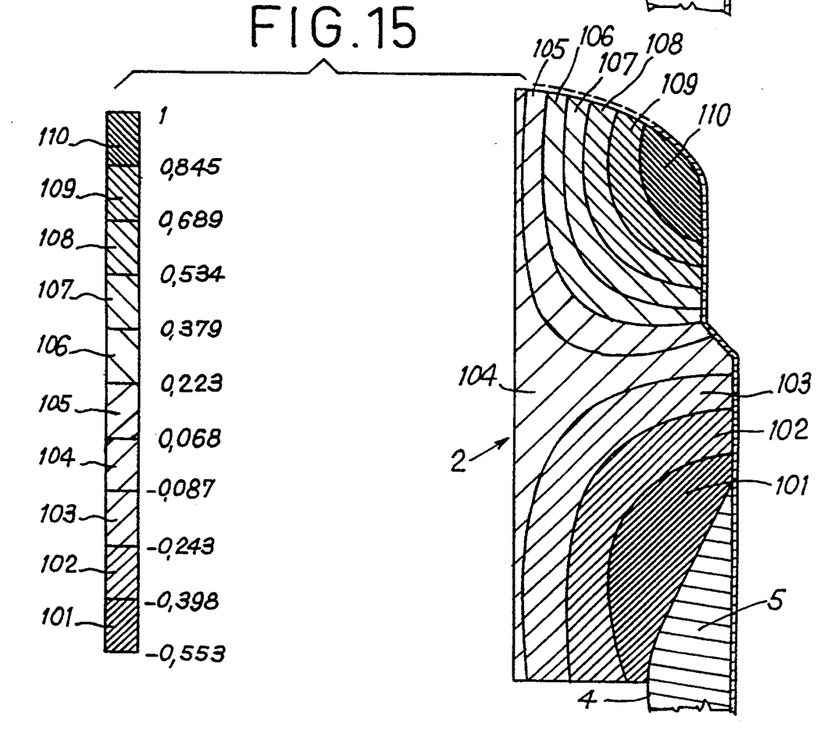

FIG. 15 shows the distribution of pressure levels in relative values in the same combustion chamber 2, not equipped with an acoustic cavity according to the invention, for the same 1 T 1 L mode.

It is noted that the disparity between the pressure levels is much greater in the case of FIG. 15, while in the case of FIG. 14, which implements the invention it is noted that the relative variations in the pressure level in the chamber are much reduced. The acoustic cavity 10, 20 thus significantly reduces the amplitude of pressure oscillations in the chamber 2, in the order of 50%.

In FIGS. 14 and 15, the different pressure regions, from the weakest to the strongest, are denoted by the reference numerals 101 to 110. At the boundaries of these areas there are obviously isobaric surfaces, shown as lines in the sections of FIGS. 14 and 15.

Modelling studies have shown especially that the acoustic cavity absorbs a large fraction of the acoustic energy. The maximum pressure level is thus attenuated in the cavity, which leads to a strong dissipation of the acoustic energy by viscosity within the cavity. In the case of FIG. 14, the length of the cavity 10, 20 has been determined in dependence on the wavelength of the mode to be damped in such a manner as to define a quarter-wave resonator and to maximize the energy absorbed in the cavity 10, 20 at the frequency in question.

Figure 16:
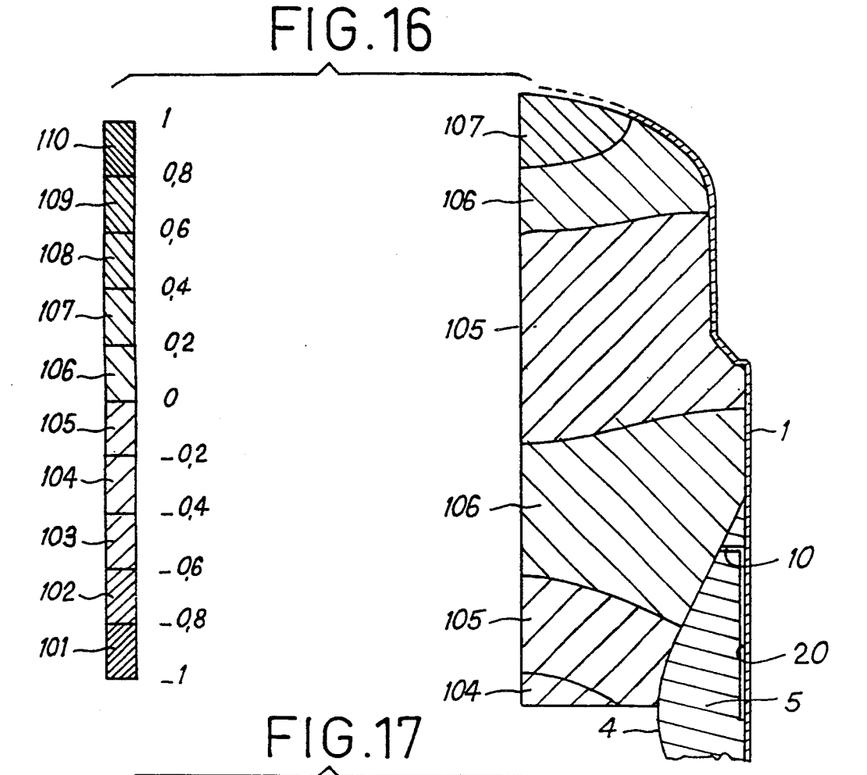
FIGS. 16 and 17 are diagrams showing the terracing of pressure variations respectively for a combustion chamber fitted with a damping system of the invention and for a combustion chamber without such a system, based on modelling with oscillations coupled according to a third longitudinal mode.
Figure 17:
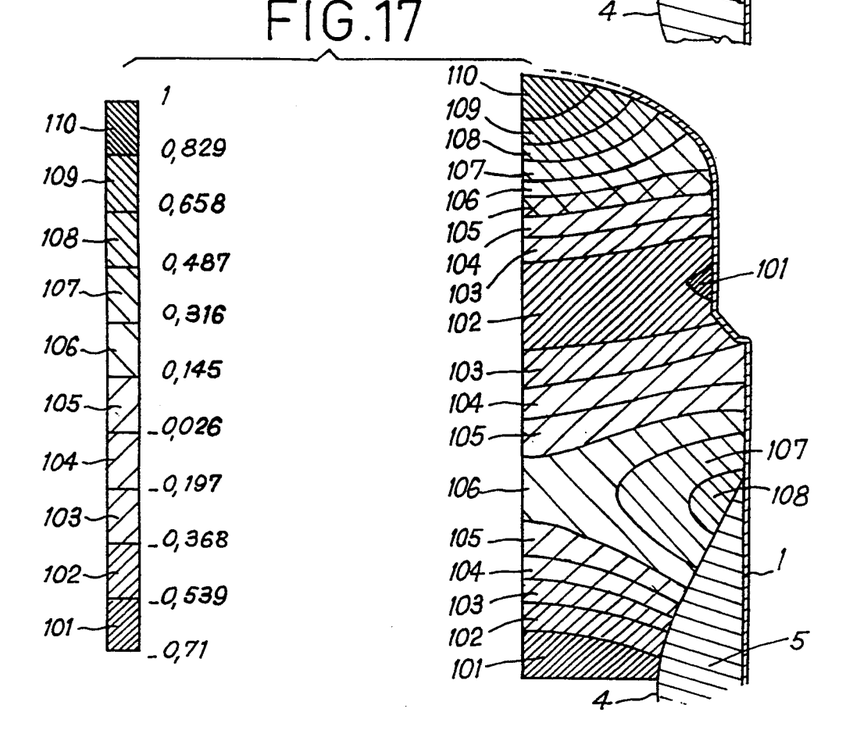

FIGS. 16 and 17 show as in FIGS. 14 and 15 the distribution of pressure levels, in relative values, in a combustion chamber 2, respectively with and without an acoustic cavity 10, 20, but for the case in which the mode in question of the third longitudinal mode (3 L).

The same reduction is noted, in the order of 50%, in the relative level in the chamber 2 in the case of the pressure map of FIG. 16, which corresponds to an embodiment with an acoustic cavity in accordance with the invention.

We claim:

1. A damping system for high frequency combustion instabilities in a combustion chamber of a rocket engine comprising an injection head and an outer wall extending from said injection head downwardly around said combustion chamber, said outer wall comprising means forming a nozzle throat and said outer wall extending further downwardly from said nozzle throat to define an open ejection cone, wherein the system comprises at least one resonant acoustic cavity disposed around the combustion chamber and having a shape and dimensions such that it functions as a quarter-wave resonator damping both longitudinal and tangential components of pressure waves, and wherein said resonant acoustic cavity comprises:

a) a main annular part whose half axial section has an elongate shape with a width dimension "e" which is smaller than its longitudinal dimension "$L_1$" which extends substantially parallel to the axis of symmetry of the combustion chamber, the mean radius "R" of the main annular part being close to the equivalent radius of modes of oscillation to be damped, and b) an annular coupling part which originates from the main annular part and which opens into the combustion chamber downstream from said injection head and upstream from said nozzle throat near to a longitudinal or radial pressure anti-node, the annular coupling part having a length "$L_2$" in a half axial section and a width dimension "h" which is substantially less than the sum of the longitudinal dimension "$L_1$ of the main annular part and the length "$L_2$" of the annular coupling part.

2. A damping system according to claim 1, wherein the annular coupling part originates in a region situated in an upper end part of the main annular part.

3. A damping system according to claim 1, wherein the annular coupling part originates in a region situated in a lower end part of the main annular part.

4. A damping system according to claim 1, wherein the annular coupling part opens into the combustion chamber through a circular aperture extending over the whole perimeter of said chamber.

5. A damping system according to claim 1, wherein the annular coupling part opens into the combustion chamber through a discontinuous circular aperture located in a plane perpendicular to the axis of the combustion chamber.

6. A damping system according to claim 1, wherein the main annular part has a half axial section substantially in the form of a rectangle.

7. A damping system according to claim 1, comprising cooling channels bordering the acoustic cavity.

8. A damping system according to claim 1, wherein the main annular part contains obstacles in the form of baffles, gratings or fibrous material, adapted to enhance the damping of acoustic waves without interrupting the continuity of the cavity.

9. A damping system according to claim 1, comprising a plurality of resonant acoustic cavities adapted to differing oscillations, comprising a plurality of coaxial main annular parts opening into annular coupling parts having at least one common portion opening into the combustion chamber.

10. A damping system according to claim 1, comprising a plurality of resonant acoustic cavities adapted to differing oscillations, comprising annular coupling parts opening into the combustion chamber at differing levels.

11. A damping system according to claim 1, wherein the main annular part is fitted between a bulge in the nozzle and a partition located at the side of the combustion chamber, wherein means are provided to cool said partition with a film of propellant on the face opposite that bounding the main annular part, and wherein the annular coupling part originates at a region located in the lower part of the main annular part.

12. A damping system according to claim 1, applied to a rocket engine whose nozzle is cooled by helical cooling channels, wherein the system comprises a cylindrical collar built round the nozzle to define said resonant acoustic cavity, and wherein the annular coupling part opens into the combustion chamber through a series of apertures formed in the nozzle between the cooling channels.

13. A damping system according to claim 1, wherein said annular coupling part is formed at an angle greater than zero with respect to the axis of symmetry of said combustion chamber.

14. A damping system according to claim 1, applied to a rocket engine whose nozzle is formed in two parts connected by flanges, wherein the resonant acoustic cavity is delimited by walls pertaining respectively to the two constituent parts of the nozzle.

15. A damping system according to claim 14, wherein the resonant acoustic cavity is cooled by means of cooling channels pertaining respectively to the two constituent parts of the nozzle and communicating with the cooling channels of the nozzle.

16. A damping system according to claim 1, applied to a rocket engine whose nozzle is cooled by parallel vertical cooling channels, wherein the system comprises a cylindrical collar built round the nozzle to define said resonant acoustic cavity, and wherein the annular coupling part opens into the combustion chamber through a series of apertures formed in the nozzle between the cooling channels.

17. A damping system according to claim 16, wherein said associated cylindrical collar is formed by a plurality of sectors welded together.

18. A damping system according to claim 16, comprising a cooling circuit for said associated cylindrical collar forming the resonant acoustic cavity.

19. A damping system according to claim 1, applied to a rocket engine whose nozzle is formed from bonded-together cooling tubes, wherein the system comprises a cylindrical collar built round the nozzle to define said resonant acoustic cavity, and wherein the annular coupling part opens into the combustion chamber through a series of passages formed by swaged parts of the tubes forming the nozzle.

20. A damping system according to claim 19, wherein said associated cylindrical collar is formed by a plurality of sectors welded together.

21. A damping system according to claim 19, comprising a cooling circuit for said associated cylindrical collar forming the resonant acoustic cavity.

22. A damping system according to claim 1, wherein the main annular part has parts of differing lengths around the perimeter of the combustion chamber, corresponding to differing damping frequencies, the bottom wall remote from the region in which the annular coupling part originates being located at differing distances from said annular coupling part but with a minimum distance allowing damping of the longitudinal and tangential components of pressure waves.

23. A damping system according to claim 22, wherein said bottom wall remote from the region in which the annular coupling part originates has the shape of a succession of steps.

24. A damping system according to claim 22, wherein said bottom wall remote from the region in which the annular coupling part originates has an undulating shape of sinusoidal form.

25. A damping system according to claim 9, wherein said bottom wall remote from the region in which the annular coupling part originates has an undulating shape of sawtooth form.

26. A damping system according to claim 1, comprising an annular acoustic cavity whose main annular part is located behind the throat of the nozzle and has a radius substantially equal to the radius of the combustion chamber.

27. A damping system according to claim 26, wherein the annular coupling part opens into the combustion chamber at the level of the upper quarter of the part forming the throat of the nozzle.

28. A damping system according to claim 27, wherein the annular coupling part opens into the combustion chamber through a circular aperture extending over the whole perimeter of said chamber, wherein the annular coupling part is formed by a continuous aperture provided between a lower main insert and a upper secondary insert defining the throat of the nozzle and wherein the main annular part is located between the outer surface of the lower main insert and the inner surface of the wall which delimits the combustion chamber and to which said lower main insert and upper secondary insert are attached.

29. A damping system according to claim 27, wherein the annular coupling part opens into the combustion chamber through a discontinuous circular aperture located in a plane perpendicular to the axis of the combustion chamber, wherein the annular coupling part is formed by a discontinuous aperture provided around the perimeter of the combustion chamber in a single solid block insert defining the throat of the nozzle, and wherein the main annular part is located between the outer surface of said single solid block insert and the inner surface of the wall which delimits the combustion chamber and to which said single solid block insert is attached.

30. A damping system for high frequency combustion instabilities in a combustion chamber, especially of a rocket engine, wherein the system comprises at least one resonant acoustic cavity disposed around the combustion chamber and having a shape and dimensions such that it functions as a quarter-wave resonator damping both longitudinal and tangential components of pressure waves, and wherein said resonant acoustic cavity comprises:

a) a main annular part whose half axial section has an elongate shape with a width dimension "e" which is smaller than its longitudinal dimension "$L_1$" which extends substantially parallel to the axis of symmetry of the combustion chamber, the mean radius "R" of the main annular part being close to the equivalent radius of modes of oscillation to be damped, and b) an annular coupling part which originates from the main annular part and which opens into the combustion chamber near to a longitudinal or radial pressure anti-node, the annular coupling part having a length "$L_2$" in a half axial section and a width dimension "h" which is substantially less than the sum of the longitudinal dimension "$L_1$ of the main annular part and the length "$L_2$" of the annular coupling part, wherein the width dimension "e" of the main annular part and the width dimension "h" of the annular coupling part of the resonant acoustic cavity lie in the range of some tenths of a millimeter to about ten millimeters.

* * * * *

UNITED STATES PATENT AND TRADEMARK OFFICE
CERTIFICATE OF CORRECTION

PATENT NO. : 5,353,598
DATED : October 11, 1994
INVENTOR(S) : Andre Huck, et al.

It is certified that error appears in the above-indentified patent and that said Letters Patent is hereby corrected as shown below:

Column ABSTRACT, line 5, "coupling the resonant" should read --coupling. The resonant--.

Column 14, line 56, "according to claim 9" should read --according to claim 22--.

Signed and Sealed this

Fifth Day of September, 1995

Attest:

BRUCE LEHMAN

Attesting Officer

Commissioner of Patents and Trademarks